United States Patent

Olson et al.

[15] 3,649,300

[45] Mar. 14, 1972

[54] METHOD OF PREPARING A MEAT PRODUCT HAVING A TEXTURE SIMILAR TO THAT OF A PRIMAL CUT AND HIGH POLYUNSATURATED FAT CONTENT

[72] Inventors: Floyd C. Olson; Everett Podebradsky, both of Madison, Wis.

[73] Assignee: Oscar Mayer & Company, Inc., Chicago, Ill.

[22] Filed: Mar. 12, 1969

[21] Appl. No.: 806,671

[52] U.S. Cl. ..............................................99/107
[51] Int. Cl. ..........................................A22c 18/00
[58] Field of Search ....................................99/107

[56] References Cited

UNITED STATES PATENTS

| | | | |
|---|---|---|---|
| 2,901,354 | 8/1959 | Douglass et al. | 99/107 X |
| 3,076,713 | 2/1963 | Maas | 99/107 |
| 3,215,534 | 11/1965 | Baum et al. | 99/107 |
| 3,309,204 | 3/1967 | Helmer et al. | 99/107 X |

*Primary Examiner*—Hyman Lord
*Attorney*—Greist, Lockwood, Greenawalt & Dewey

[57] ABSTRACT

Primal cuts of meat are fabricated from coarse-sized pieces of lean uncooked muscle meat by mixing the same in the presence of vegetable oil having a polyunsaturated fat content exceeding its saturated fat content, the amount of vegetable oil being sufficient so that the overall polyunsaturated fat content of the final product at least equals the saturated fat content thereof. Usually a small amount of seasoning such as ordinary salt, and preferably antioxidant treated salt, may be incorporated. Desirably, a small percentage of an edible polyphosphate is also incorporated in the mixture. The mixing of ingredients is continued until sufficient exudate is emitted from the pieces of meat to bind the same together. The mixed mass is formed into one or more bodies of predetermined cross section and then, either cooked directly, or frozen for subsequent cooking. Roasts, chops and other primal cuts characterized by higher than normal polyunsaturated fat content may be fabricated from pieces of whole muscle meat in accordance with this procedure.

This invention relates, generally, to innovations and improvements in fabricating bodies of meat having textures similar to those of primal cuts and characterized by substantially higher than normal content of polyunsaturated fat.

8 Claims, No Drawings

METHOD OF PREPARING A MEAT PRODUCT HAVING A TEXTURE SIMILAR TO THAT OF A PRIMAL CUT AND HIGH POLYUNSATURATED FAT CONTENT

The natural animal fat content of meat is high in saturated fats and low in polyunsaturated fats. In recent years there has arisen a dietetic requirement for primal cuts of meat (e.g., chops, steaks, roasts, etc.) which have an adequate fat content for purposes of flavor and texture but in which the ratio of the content of polyunsaturated fat to the content of saturated fat is at least one to one, and greater if desired.

The object of the present invention, generally stated, is the provision of fabricated primal cuts of meat having the texture and flavor ordinarily associated with and characteristic of such primal cuts, but in which the content of polyunsaturated fat is much higher than normal and is at least sufficient so that the ratio thereof to the content of saturated fat is at least one to one.

Another object of the invention is the provision of a practical and economical method of producing primal cuts of meat of the character described.

Certain other objects of the invention will, in part, be obvious and will in part appear hereinafter.

For a more complete understanding of the nature and scope of the invention, reference may now be had to the following detailed description thereof in which working examples are set forth giving the presently preferred embodiments of the invention.

As indicated, the term "primal cut" designates whole, uncooked bodies of fresh or frozen raw meat such as roasts, steaks, chops, loins, shoulders and hams, as distinguished from ground meat products such as hamburger meat, meat loaf, or fresh pork sausage.

Although the nutritional value may be the same, there is a wide difference in the texture flavor and eating properties between a primal cut, e.g., a sirloin steak, and the same quantity or piece of meat ground into hamburger meat. The present invention pertains to making or fabricating bodies of meat having texture similar to those of primal cuts as distinguished from ground meat.

GENERAL PROCEDURE

Any source or type of whole, uncooked or raw meat may be used in practicing the invention including pork, beef, veal, lamb, chicken, turkey or fish, or any combination thereof. Lean meat of any one of the foregoing types is trimmed to remove external fat and gristle. The lean meat is cut or coarse ground into pieces preferably weighing at least about ¼ pound each, although pieces as small as 1 ounce may be used, especially when mixed with larger pieces. For example, boneless pork loin may be utilized as a source of lean meat pieces. After the loins have been trimmed to remove backstrap and other fat they may be cut into strips about 1 inch by 1 inch in cross section and about 6 inches long, or the loins may be ground through a coarse plate such as one having one inch to 1½ inch size openings. It is not necessary that the pieces of lean meat be of either uniform size or shape.

The pieces of coarse, lean, uncooked muscle meat constitute the main ingredient used in practicing the invention. On a percentage basis the pieces of lean meat will usually constitute at least about 85 percent by weight of the total product.

The content of polyphosphate when used in the mixture ranges upwardly from a minimum amount sufficient to improve and enhance the binding together of the pieces of lean meat into one unitary mass which may be formed, sliced and cooked without falling apart. An excess of polyphosphate is to be avoided since it will impart bitterness to the product. A generally satisfactory range of concentration of polyphosphate is from 0.05 to 0.75 percent of the mixture. Various polyphosphates having various positively and negatively charged radicals may be used including any of the sodium, potassium or ammonium salts of tripolyphosphoric acid, pyrophosphoric or hexametaphosphoric acid. Usually a sodium salt will be employed, e.g., sodium tripolyphosphate, tetrasodium pyrophosphate or sodium hexametaphosphate. Ordinary salt (sodium chloride) up to about 3 percent by weight of the product may be included but its presence tends to reduce shelf life if the product is frozen and held in the frozen state because of the development of discoloration in the frozen products and of rancidity in freeze-dried products. Color retention of the frozen products is improved if antioxidant salt (i.e., sodium chloride carrying a small proportion of food antioxidant) is used. Suitable antioxidant salts are described in U.S. Pat. No. 2,511,804 dated June 13, 1950.

The mass of pieces of lean meat, vegetable oil having a polyunsaturated to saturated fat ratio (P/S) greater than two, polyphosphate and salt may be mixed in any suitable mixing equipment such as ribbon blender, a Buffalo Mixer, a churn-type mixer, Moyno pump, etc. Preferably, the mixer is equipped with a vacuum attachment so the latter portion of the mixing cycle or phase can be carried out under vacuum. The mixing time may range from approximately 3 to 30 minutes, being continued until sufficient exudate is emitted from the pieces of meat to bind them together. Typically, a batch is mixed for approximately 7 minutes and then mixed for an additional 5 minutes under vacuum.

After mixing, the contents of the mixer are discharged into suitable apparatus for stuffing or filling into forms or casings of the desired shapes and sizes, e.g., square, circular, oval, or cross sections corresponding to steaks, chops, center cuts, roasts, etc. Commercial stuffing equipment may be used and the stuffed forms or casings may be removed and cooked or frozen in known manner. The cooked or frozen bodies of the mixed and blended meat may be sliced to form steaks, chops, center cuts, etc.

EXAMPLE 1

Polyunsaturated/saturated (P/S) fat ratio of 1/1.

Boneless pork loins of 7/9 lb. avg. weight were trimmed of external fat and gristle. The lean meat was cut into pieces about 1 inches × 1 inches × 6 inches. The following ingredients were mixed in a Buffalo Mixer for 7 minutes followed by an additional 5 minutes under vacuum:

| Ingredient | Wt. (lb.) |
| --- | --- |
| Lean pork loin pieces | 38 |
| Corn oil | 1.8 |
| Antioxidant salt | 0.4 |
| Tetrasodiumpyrophosphate (hydrate) ($Na_4P_2O_7 \cdot 10H_2O$) | 0.2 |

The mixed material was stuffed into forms having the cross section of pork loins and frozen in a −20° F. freezer. After the material was frozen it was removed from the forms and part of the product was sliced into ½ inch thick "chops," and part was left in loaves of several pounds for preparation as "roasts."

"Chops" fried in a pan held together and tasted nearly the same as product made without corn oil. "Roasts" were oven heated then sliced thinly with an electric knife. The slices held together and tasted similar to product made without corn oil.

EXAMPLE 2

P/S ratio of 2/1.

Boneless pork loins of 7/9 lbs. avg. weight were trimmed of external fat and gristle. The lean meat was cut into pieces about 1 inch × 1 inch × 6 inch The following ingredients were mixed 12 minutes, held overnight in a 32° F. cooler then remixed under vacuum for 12 minutes:

| Ingredient | Wt. (lb.) |
| --- | --- |
| Lean pork loin pieces | 34.5 |
| Corn oil | 4.9 |
| Antioxidant salt | 0.4 |
| Tetrasodiumpyrophosphate | 0.2 |

The mixed material was stuffed into forms and frozen as in Example 1. The resulting "chops" and "roasts" were comparable to those obtained in Example 1.

EXAMPLE 3

P/S ratio of 3/1.
Same as Example 2 but with the following formulation:

| Ingredient | Wt. (lb.) |
| --- | --- |
| Lean pork loin pieces | 34.0 |
| Safflower oil | 5.4 |
| Antioxidant salt | 0.4 |
| Tetrasodiumpyrophosphate (hydrate) ($Na_4P_2O_7 \cdot 10H_2O$) | 0.2 |

EXAMPLE 4

Beef with polyunsaturated/saturated fat ratio of 1/1.
Beef ham sets of canner/cutter grade were trimmed of fat and gristle. The lean meat was cut into pieces about 1 inch × 1 inch × 6 inches. The following ingredients were mixed for 7 minutes followed by an additional 5-minute mix under vacuum:

| Ingredient | Wt. (lbs.) |
| --- | --- |
| Lean beef ham sets | 38 |
| Safflower oil | 1.8 |
| Antioxidant salt | 0.4 |
| Tetrasodiumpyrophosphate (hydrate) ($Na_4P_2O_7 \cdot 10H_2O$) | 0.2 |

The mixed material was stuffed into No. 6 fibrous casings and frozen in a −20° F. freezer. After the material was frozen it was sliced into ⅜ inch thick "steaks" or left in loaves of several pounds for preparation as "roasts." "Steaks" prepared on a grill held together and tasted nearly the same as product made without safflower oil. "Roasts" were oven heated then sliced thinly with an electric knife. The slices held together and tasted similar to product made without safflower oil.

EXAMPLE 5

Turkey breast meat with polyunsaturated/saturated fat ratio of 2/1.
Boneless turkey breast meat was cut into pieces no larger than ¼ pound. The following ingredients were mixed for seven minutes followed by an additional 5-minute mix under vacuum:

| Ingredient | Wt. (lbs.) |
| --- | --- |
| Boneless turkey breast meat | 39 |
| Sunflower oil | 0.4 |
| Antioxidant salt | 0.4 |
| Tetrasodiumpyrophosphate (hydrate) ($Na_4P_2O_7 \cdot 10H_2O$) | 0.2 |

The mixed material was stuffed into No. 6 fibrous casings and frozen in a −20° F. freezer.

In the foregoing examples the corn oil, safflower oil, and sunflower oil may be in whole or part replaced with other edible vegetable oils in the amounts to give the proper P/S ratio. Such other oils include soybean oil, peanut oil and cottonseed oil. The tetrasodiumpyrophosphate may be replaced in whole or part by other edible polyphosphates such as sodium tripolyphosphate or sodium hexametaphosphate. While the polyphosphate has a preserving action, particularly when the product is held in the frozen condition, and also has moisture retention properties, nevertheless, the same may be omitted from products where these actions are not particularly necessary or desired.

The manner in which the amount of vegetable oil to be included in a formulation may be illustrated as follows in preparing a white turkey meat product having a P/S=2 and using sunflower oil as the polyunsaturated vegatable oil:

Fat in turkey breast meat is 35.8 percent polyunsaturated and 40.0 percent saturated fatty acids. This gives a P/S ratio of 0.9. To give a P/S ratio of 2. with Sunflower Oil:
Turkey breast meat fat content - 1.2 percent
For 100 lbs. turkey = 1.2 lbs. fat
.358 × 1.2 = 0.43 lbs. polyunsaturated fatty acids
.400 × 1.2 = .48 lbs. saturated fatty acids
Let $x$ = Sunflower oil for P/S = 2
Sunflower oil contains 73.1 percent polyunsaturated fatty acids and 11.2 percent saturated fatty acids.

$$\frac{.43 \text{ lbs.} + .731x}{.48 \text{ lbs.} + .112x} = \frac{2}{1} \quad x = 1.0$$

Thus, for P/S = 2, 100 lbs. of turkey will require 1.0 lbs. of Sunflower Oil.

We claim:

1. The method of preparing a meat product having a texture similar to that of a primal cut and an overall polyunsaturated to saturated fat content ratio of at least about 1 to 1, which comprises, mixing coarse-sized pieces of lean, uncooked muscle meat for the most part weighing at least about 4 ounces each and a vegetable oil having a polyunsaturated fat content exceeding its saturated fat content in a proportion sufficient to provide said overall polyunsaturated to saturated fat content ratio of at least about one to one, said mixing being continued for at least about 3 minutes until sufficient exudate is emitted from said pieces of meat to bind said pieces together, forming the resultant mass into as least one body of predetermined cross section which is adapted to be cooked directly or to be frozen and subsequently cooked.

2. The method of claim 1 wherein said vegetable oil is selected from the group consisting of corn oil, safflower oil, peanut oil, sunflower, soybean oil, and cottonseed oil.

3. The method of claim 1 wherein seasoning salt up to about 3 percent by weight is included in the mass undergoing said mixing.

4. The method of claim 3 wherein said seasoning salt has been treated with at least one food antioxidant.

5. The method of claim 1 wherein from about 0.05 to about 0.75 percent by weight a polyphosphate is incorporated in the mass undergoing said mixing.

6. The method of claim 5 wherein the positively charged radical of said polyphosphate is selected from the group consisting of sodium, potassium and ammonium radicals and the negative radical is selected from the group consisting of the tripolyphosphate, pyrophosphate and hexametaphosphate radicals.

7. The method of claim 6 wherein seasoning salt up to about 3 percent by weight is included in the mass undergoing said mixing.

8. The method of claim 7 wherein said seasoning salt has been treated with at least one food antioxidant.

* * * * *

UNITED STATES PATENT OFFICE
CERTIFICATE OF CORRECTION

Patent No. 3,649,300         Dated March 14, 1972

Inventor(s) Floyd C. Olson et al

It is certified that error appears in the above-identified patent and that said Letters Patent are hereby corrected as shown below:

In column 2, line 66, before the word "The" insert a --.--

In column 4, line 25, before the number "731x" insert a --.--

In column 4, line 47, after the word "sunflower insert the word --oil--

Signed and sealed this 29th day of August 1972.

(SEAL)
Attest:

EDWARD M. FLETCHER, JR.
Attesting Officer

ROBERT GOTTSCHALK
Commissioner of Patents